United States Patent
Ardeli (10) Patent No.: US 10,984,103 B2
(45) Date of Patent: Apr. 20, 2021

(54) MALWARE DETECTION

(71) Applicant: Hewlett Packard Enterprise Development LP, Houston, TX (US)

(72) Inventor: Ramesh Ardeli, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 204 days.

(21) Appl. No.: 16/071,016

(22) PCT Filed: Jan. 26, 2016

(86) PCT No.: PCT/US2016/014841
§ 371 (c)(1),
(2) Date: Jul. 18, 2018

(87) PCT Pub. No.: WO2017/131626
PCT Pub. Date: Aug. 3, 2017

(65) Prior Publication Data
US 2019/0026465 A1   Jan. 24, 2019

(51) Int. Cl.
*G06F 21/56* (2013.01)
*H04L 29/06* (2006.01)
*G06F 16/955* (2019.01)
*G06F 16/901* (2019.01)

(52) U.S. Cl.
CPC ........ *G06F 21/564* (2013.01); *G06F 16/9014* (2019.01); *G06F 16/955* (2019.01); *G06F 21/566* (2013.01); *G06F 21/567* (2013.01); *H04L 63/0236* (2013.01); *H04L 63/0245* (2013.01); *H04L 63/145* (2013.01); *G06F 2221/2119* (2013.01)

(58) Field of Classification Search
CPC .............................. G06F 21/564; H04L 63/145
See application file for complete search history.

(56) References Cited

U.S. PATENT DOCUMENTS

| | | | | |
|---|---|---|---|---|
| 8,443,449 | B1 * | 5/2013 | Fan ...................... | G06F 21/564 713/188 |
| 8,607,347 | B2 * | 12/2013 | Harris ................... | G06F 21/565 713/179 |
| 8,826,438 | B2 | 9/2014 | Perdisci et al. | |
| 8,893,294 | B1 * | 11/2014 | Steele, III ........... | G06F 16/9577 726/26 |
| 10,009,374 | B1 * | 6/2018 | Jing .................... | H04L 63/1466 |

(Continued)

FOREIGN PATENT DOCUMENTS

EP    2333686 A2    6/2011

OTHER PUBLICATIONS

"Hikit Analysis," pp. 2014, 1-19, Novetta.
(Continued)

*Primary Examiner* — Jason Chiang
(74) *Attorney, Agent, or Firm* — International IP Law Group, PLLC (57) ABSTRACT

An example implementation of the present techniques determines, in response to a request to download a resource, whether the resource has previously been determined to comprise malware. Additionally, it is determined, if the resource has previously been determined to comprise malware, whether the resource has changed since the previous determination. Further the request to download the resource is terminated if the resource has not changed.

5 Claims, 7 Drawing Sheets

(56) References Cited

U.S. PATENT DOCUMENTS

| | | | |
|---|---|---|---|
| 10,057,279 B1* | 8/2018 | Balduzzi | H04L 63/145 |
| 2003/0097591 A1* | 5/2003 | Pham | H04L 63/145 |
| | | | 726/24 |
| 2005/0021994 A1 | 1/2005 | Barton et al. | |
| 2005/0033975 A1* | 2/2005 | Lahti | G06F 21/566 |
| | | | 726/26 |
| 2005/0132205 A1* | 6/2005 | Palliyil | H04L 63/145 |
| | | | 713/188 |
| 2006/0253581 A1* | 11/2006 | Dixon | G06Q 30/02 |
| | | | 709/225 |
| 2007/0156965 A1* | 7/2007 | Sundarrajan | G06F 16/9574 |
| | | | 711/133 |
| 2008/0229419 A1* | 9/2008 | Holostov | H04L 63/145 |
| | | | 726/24 |
| 2011/0083186 A1 | 4/2011 | Niemela et al. | |
| 2011/0126287 A1 | 5/2011 | Yoo | |
| 2011/0197281 A1 | 8/2011 | Alme et al. | |
| 2011/0219450 A1 | 9/2011 | McDougal et al. | |
| 2011/0314546 A1* | 12/2011 | Aziz | H04L 63/126 |
| | | | 726/24 |
| 2012/0185939 A1 | 7/2012 | Turbin | |
| 2012/0278886 A1* | 11/2012 | Luna | G06F 21/552 |
| | | | 726/22 |
| 2013/0145470 A1 | 6/2013 | Richard et al. | |
| 2013/0191914 A1* | 7/2013 | Dubrovsky | H04L 63/101 |
| | | | 726/22 |
| 2013/0198313 A1* | 8/2013 | Hayton | H04L 67/2852 |
| | | | 709/213 |
| 2013/0238808 A1* | 9/2013 | Hallem | H04W 12/08 |
| | | | 709/227 |
| 2013/0247201 A1* | 9/2013 | Alperovitch | H04L 63/145 |
| | | | 726/24 |
| 2013/0276126 A1* | 10/2013 | Zhou | G06F 21/577 |
| | | | 726/25 |
| 2014/0304325 A1 | 10/2014 | Khanal et al. | |
| 2017/0171291 A1* | 6/2017 | Allen | H04L 67/1025 |

OTHER PUBLICATIONS

Auxilia.M and Tamilselvan.D, "Anomaly Detection Using Negative Security Model in Web Application," 2010 CISIM, Oct. 8-10, 2010, pp. 481-486, IEEE.

J. Franks et al., "HTTP Authentication: Basic and Digest Access Authentication," Jun. 1999, pp. 1-16, Network Working Group, Request for Comments: 2617.

PCT International Search Report issued in PCT/US2016/014841; dated Sep. 12, 2016; 3 pages.

European Supplementary Search Report and Search Opinion Received for EP Application No. 16888362.7, dated Jul. 1, 2019, 8 pages.

* cited by examiner

MALWARE DETECTION

BACKGROUND

Malware refers to a variety of dangerous or otherwise undesirable software that includes viruses, ransomware, spyware, and other, malicious applications. Malware can take the form of executables, scripts, or other infected software that may be downloaded to, and installed on, a computer. In many cases, firewalls are used to detect malware and prevent its installation before it can be do any harm. However, many malware detection approaches are processor intensive, which is computationally expensive, impeding the ability of firewalls to efficiently prevent the spread of malware.

BRIEF DESCRIPTION OF THE DRAWINGS

Certain example implementations are described in the following detailed description and in reference to the drawings, in which.

DETAILED DESCRIPTION

As described above, malware detection can be processor intensive. Yet, once malware has been detected, preventing future installation of the detected malware is typically accomplished by performing the same processor intensive operations.

However, in examples of the present techniques, downloads of previously detected malware are prevented. These downloads are prevented by maintaining a record of detected malware. When resources are requested for download, a check is performed to determine if the resource has been previously determined to be infected with malware. Additionally, a check is performed to see if the resource has changed since the malware was detected. If the resource has changed, the download is allowed to proceed, and traditional malware detection is performed to ensure the changed resource is not infected. If the resource has not changed, the download is prevented. In this way, the firewall detects the malware in the requested resource without downloading the resource and scanning it, thus improving the speed of malware detection.

Figure 1:
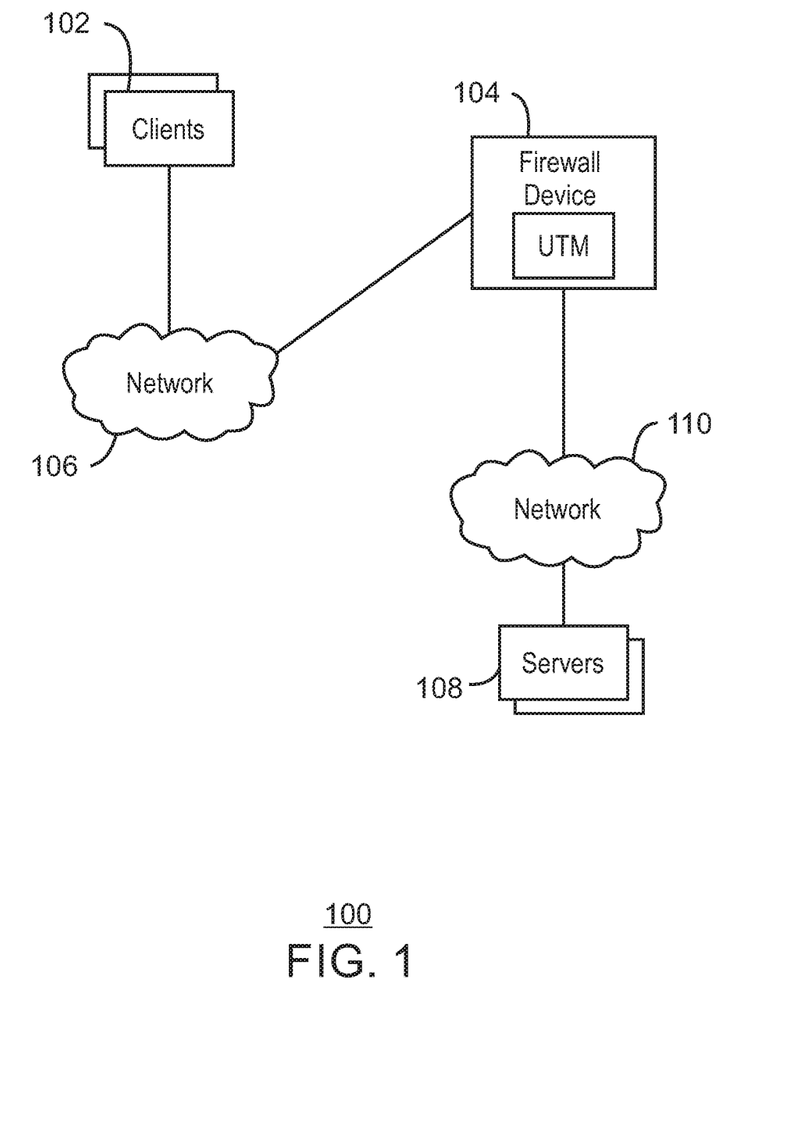
FIG. 1 is a block diagram of an example system for detecting malware.

FIG. 1 is a block diagram of an example system 100 for detecting malware. The example system is generally referred to by the reference number 100 and can be implemented using the example computing device 602 of FIG. 6 below.

The example system 100 of FIG. 1 includes clients 102 and a firewall device 104 in communication over a network 106. The system 100 also includes servers 108 in communication with the firewall device 104 over network 110. The clients 102 may be computing devices, such as desktop computers, laptop computers, tablet computers, smart-phones, and the like. The firewall device 104 is a security system that monitors and controls the network traffic incoming to, and outgoing from, the network 106. The firewall device 104 includes a unified threat manager (UTM) 112. The UTM 112 is security software that may be capable of performing network firewalling, network intrusion prevention, anti-virus and anti-spam functions, and the like. The network 106 may be a computer communication network, such as a local area network. The servers 108 may be web servers, or ftp servers, that host resources requested by the clients 102. Resources may be files or other content, such as downloadable files and web pages. The network 110 may be a computer communication network or collection of networks, such as the Internet.

The clients 102 make requests through the firewall device 104 for resources from the servers 108. The firewall device 104 receives the requests from the clients 102, and passes the requests to the servers 108. The servers 108 respond to the requests by downloading the requested resources back to the firewall device 104. The UTM 112 then performs traditional methods to determine if the requested resource is infected with malware. Traditional methods include signature scanning and hash lookup. Signature scanning involves scanning each packet of the requested resource, and comparing the packets to a database of known malware signatures. Hash lookup involves comparing a hash value for the entire resource against a table consisting of hash values for known malware files. Traditional methods may additionally include executing the requested resource in a sandbox environment. A sandbox environment is an execution environment that is isolated to prevent malware from making potentially damaging changes to the firewall device 104 or client 102. Resources that are potentially infected are run in the sandbox environment and monitored to determine if they contain malware. The firewall device 104 may perform these techniques concurrently on multiple requests from multiple clients 102. Typically, using these methods consumes numerous CPU cycles of the firewall device 104, reducing the number of concurrent scans able to be supported by the firewall device 104. However, in implementations of the claimed subject matter, once an infected resource has been detected, these techniques can be avoided, thus increasing the number of concurrent requests that can be scanned.

If no malware is detected, the resource is determined to be clean, and sent to the requesting client 102. However, if malware is detected, the resource is determined to be infected, the connection between the client 102 and the server 108 is reset, and all data packets received from the server 108 providing the infected resource are dropped. Additionally, an entry for the infected resource is stored locally. Subsequently, when a client 102 requests a resource to be downloaded, the UTM 112 performs a lookup in the local store to determine if the requested resource has been previously determined to be infected with malware. If the lookup is successful, a check is performed to determine if the requested resource has changed since the malware was detected. If the resource has not changed, the resource is considered still infected. Accordingly, the UTM 112 resets the connection to the server 108 and drops all received packets. If the resource has changed, the entry for the resource is removed from the local store, the resource is downloaded, and the UTM 112 performs the traditional methods to detect malware.

Figure 2:
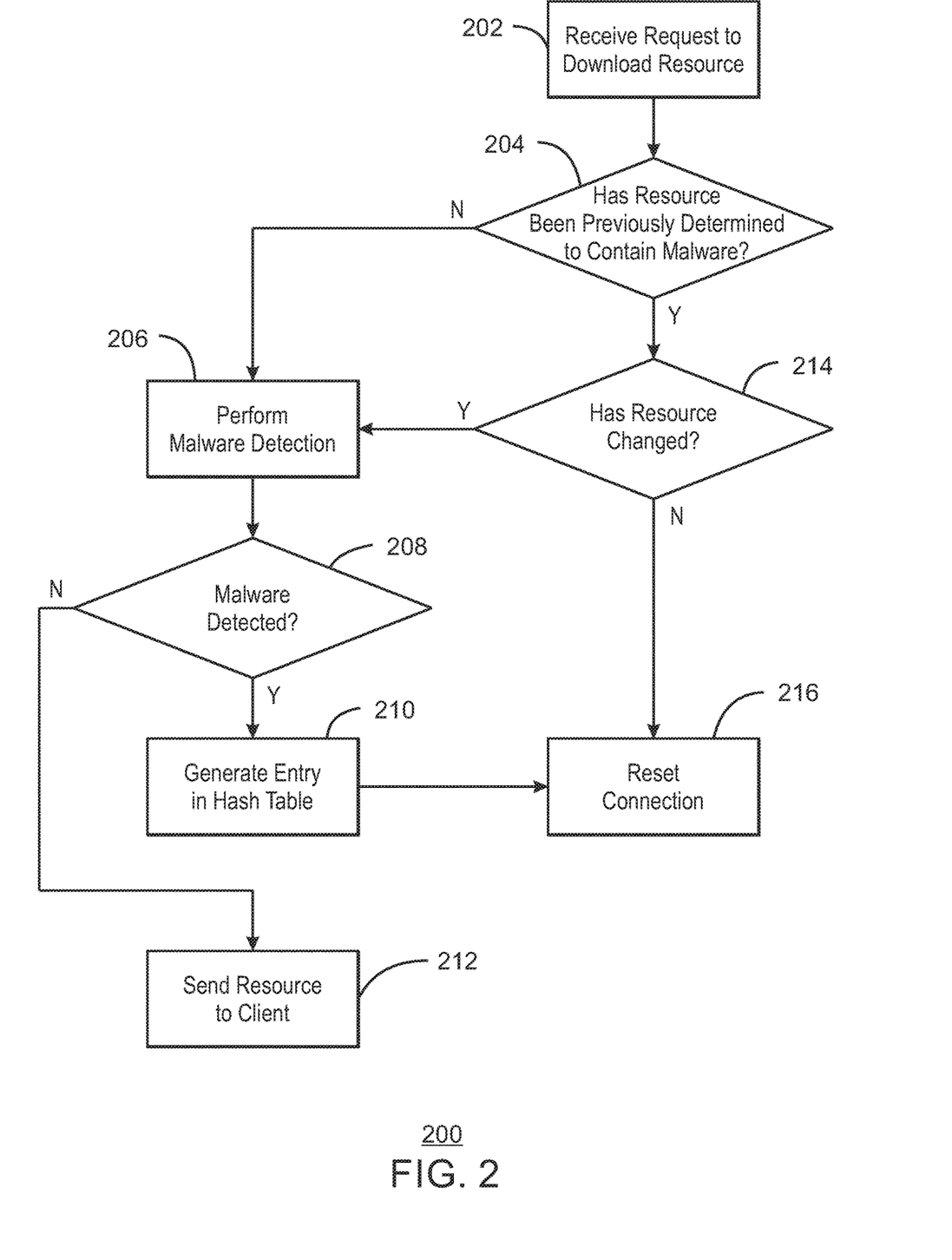
FIG. 2 is a process flow diagram showing an example method of detecting malware.

FIG. 2 is a process flow diagram showing an example method 200 of detecting malware. The example method is generally referred to by the reference number 200 and can be implemented using the processor 608 of the example system 600 of FIG. 6 below.

The method 200 begins at block 202, where the firewall device 104 receives a request from a client 102 to download a resource. The firewall device 104 passes the request to the server 108 specified in the request, and downloads the resource to the firewall device 104.

At block 204, the UTM 112 determines whether the resource has been previously determined to contain malware. In an example of the claimed subject matter, a hash lookup table contains an entry for every resource previously determined to contain malware. Each entry consists of a hash value for the absolute uniform resource locator (URL), and the Etag. The Etag is an opaque identifier assigned to the resource by a web server of the server 108. Whenever there is a change to a resource, the web server generates a new Etag for the resource. The Etag is part of the hypertext transfer protocol (HTTP), which is used for cache validation, and instructing a web browser to make a conditional request. With ETag, the browser determines whether to serve the resource locally or from server, if the resource is cached. Since the file is not completely sent to the client, when malware is detected, the client will not be able to cache the resource. The Etag is included in the header packet of the downloaded resource. The header packet is the first packet sent to the firewall device 104 when the resource is downloaded. The lookup is performed using the absolute URL of the requested resource. If the lookup is not successful, i.e., there is no entry in the hash table for the absolute URL, then the resource has not been previously determined to contain malware. Accordingly, the method flows to block 206.

At block 206, malware detection is performed using traditional methods. The UTM 112 copies the downloaded resource to local memory of the firewall device, performs signature scanning, hash lookup, and execution in the sandbox environment.

At block 208, it is determined whether malware is detected using the traditional methods. If malware is detected, the method 200 flows to block 210.

At block 210, an entry is generated in the hash table for the resource. As stated previously, the entry contains a hash value for the absolute URL of the resource, and the Etag.

Referring back to block 208, if malware is not detected, the method 200 flows to block 212. At block 212, the downloaded resource is sent to the client 102.

Referring back to block 204, if the resource has not been previously determined to contain malware, the method flows to block 214. At block 214, the UTM 112 determines whether the resource has changed since malware was detected in this resource. In examples of the claimed subject matter, the UTM 112 compares the Etag in the hash lookup entry to the Etag in the header packet of the resource. If the Etags are the same, there has been no change. Thus, the resource is determined to still contain malware. Accordingly, at block 216, the connection to the server 108 hosting the resource is reset. Additionally, all data packets received over the reset connection are dropped. Dropping the received data packets means the data packets are deleted.

Referring back to block 214, if the Etags are not the same, there has been a change to the resource. As such, it is possible that the resource no longer contains malware. Accordingly, the entry for the resource is removed from the hash lookup table. Additionally, the method flows to block 206, where malware detection is performed using the traditional methods.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation.

Figure 3:
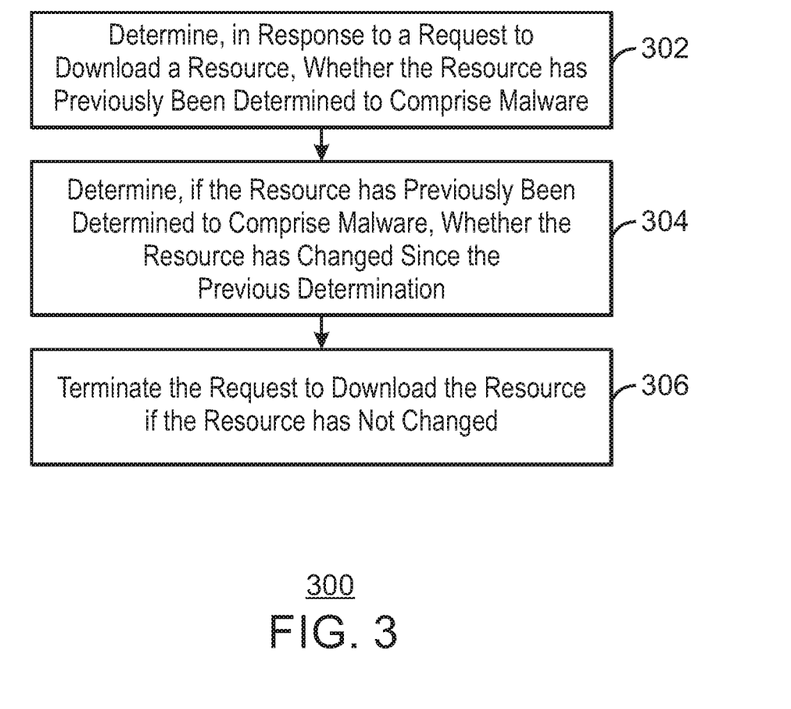
FIG. 3 is a process flow diagram showing an example method of detecting malware.

FIG. 3 is a process flow diagram showing an example method 300 of detecting malware. The example method is generally referred to by the reference number 300 and can be implemented using the processor 608 of the example system 600 of FIG. 6 below. The method 300 is performed by the UTM 112, and begins at block 302, where, in response to a request to download a resource, the UTM 112 determines whether the resource has previously been determined to comprise malware. As stated previously, the UTM 112 performs a hash lookup based on the absolute URL of the resource. If the lookup is successful, the resource is determined to comprise malware.

At block 304, if the resource has previously been determined to comprise malware, the UTM 112 determines whether the resource has changed since the previous determination. As stated previously, the UTM 112 compares the Etag in the hash lookup table with the current Etag of the resource. If the two Etags match, the resource is determined to have not changed.

At block 306, if the resource has not changed, the UTM 112 terminates the request to download the resource.

Figure 4:
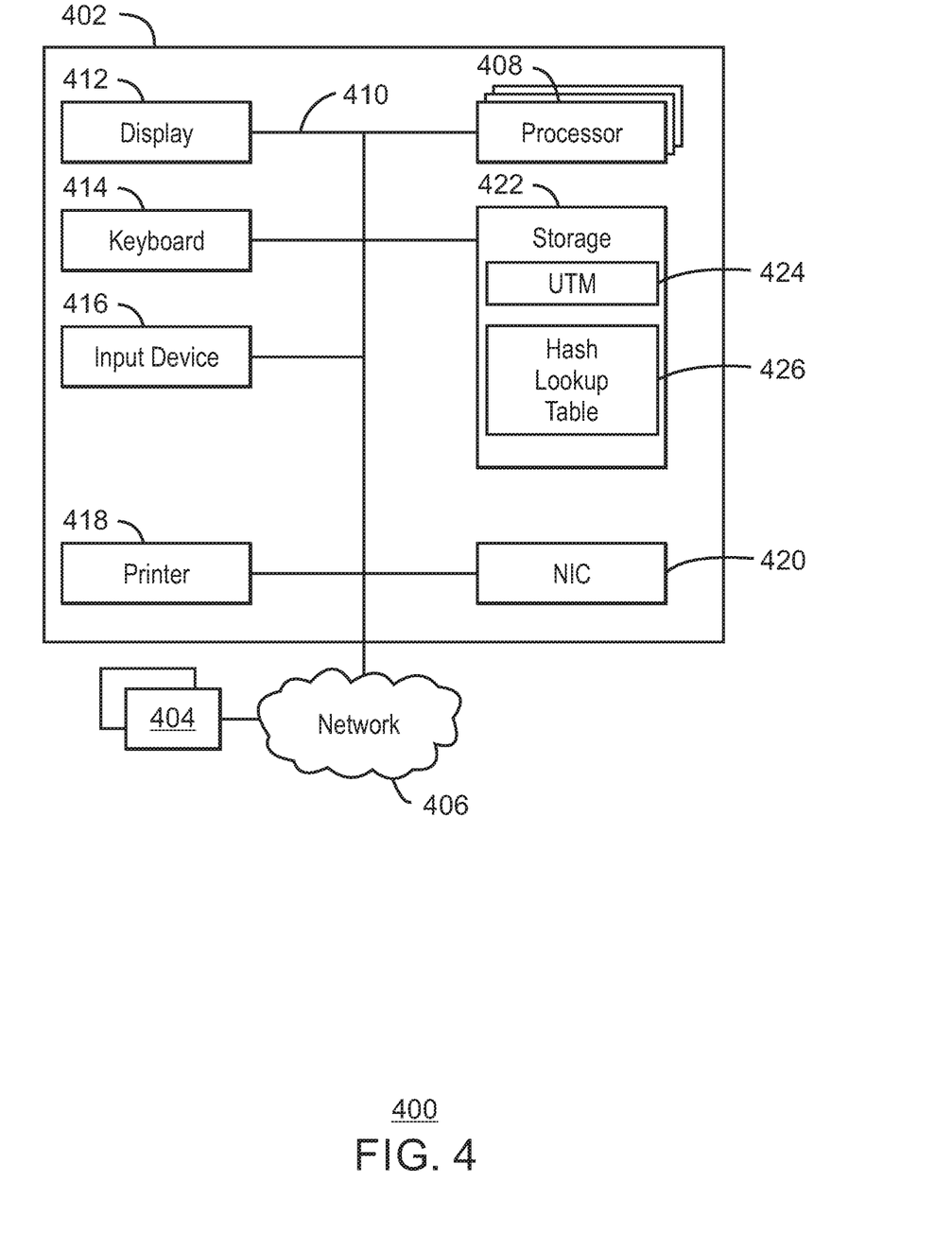
FIG. 4 is a block diagram of an example system for detecting malware.

FIG. 4 is a block diagram of an example system for detecting malware. The system is generally referred to by the reference number 400.

The system 400 may include a firewall device 402, and one or more client computers 404, in communication over a network 406. As used herein, the firewall device 402 may include a server, a personal computer, a tablet computer, and the like. As illustrated in FIG. 4, the firewall device 402 may include one or more processors 408, which may be connected through a bus 410 to a display 412, a keyboard 414, one or more input devices 416, and an output device, such as a printer 418. The input devices 416 may include devices such as a mouse or touch screen. The processors 408 may include a single core, multiples cores, or a cluster of cores in a cloud computing architecture. The computing device 402 may also be connected through the bus 410 to a network interface card (NIC) 420. The NIC 420 may connect the firewall device 402 to the network 406.

The network 406 may be a local area network (LAN), a wide area network (WAN), or another network configuration. The network 406 may include routers, switches, modems, or any other kind of interface device used for interconnection. The network 406 may connect to several client computers 404. Through the network 406, several client computers 404 may connect to the firewall device 402. Further, the firewall device 402 may prevent malware from entering the network 406. The client computers 404 may be similarly structured as the firewall device 402.

The firewall device 402 may have other units operatively coupled to the processor 408 through the bus 410. These units may include non-transitory, tangible, machine-readable storage media, such as storage 422. The storage 422 may include any combinations of hard drives, read-only memory (ROM), random access memory (RAM), RAM drives, flash drives, optical drives, cache memory, and the like. The storage 422 may include a unified threat manager (UTM) 424, which performs the techniques described herein.

The storage 422 may also include a hash lookup table 426. The hash lookup table 426 includes an entry for each resource determined to contain malware. The UTM 424 uses the hash lookup table 426 to determine if resources requested by the clients 404 have been previously determined to contain malware. Further, the UTM 424 may add entries to the hash lookup table 426 whenever a requested resource is determined to contain malware.

Figure 5:
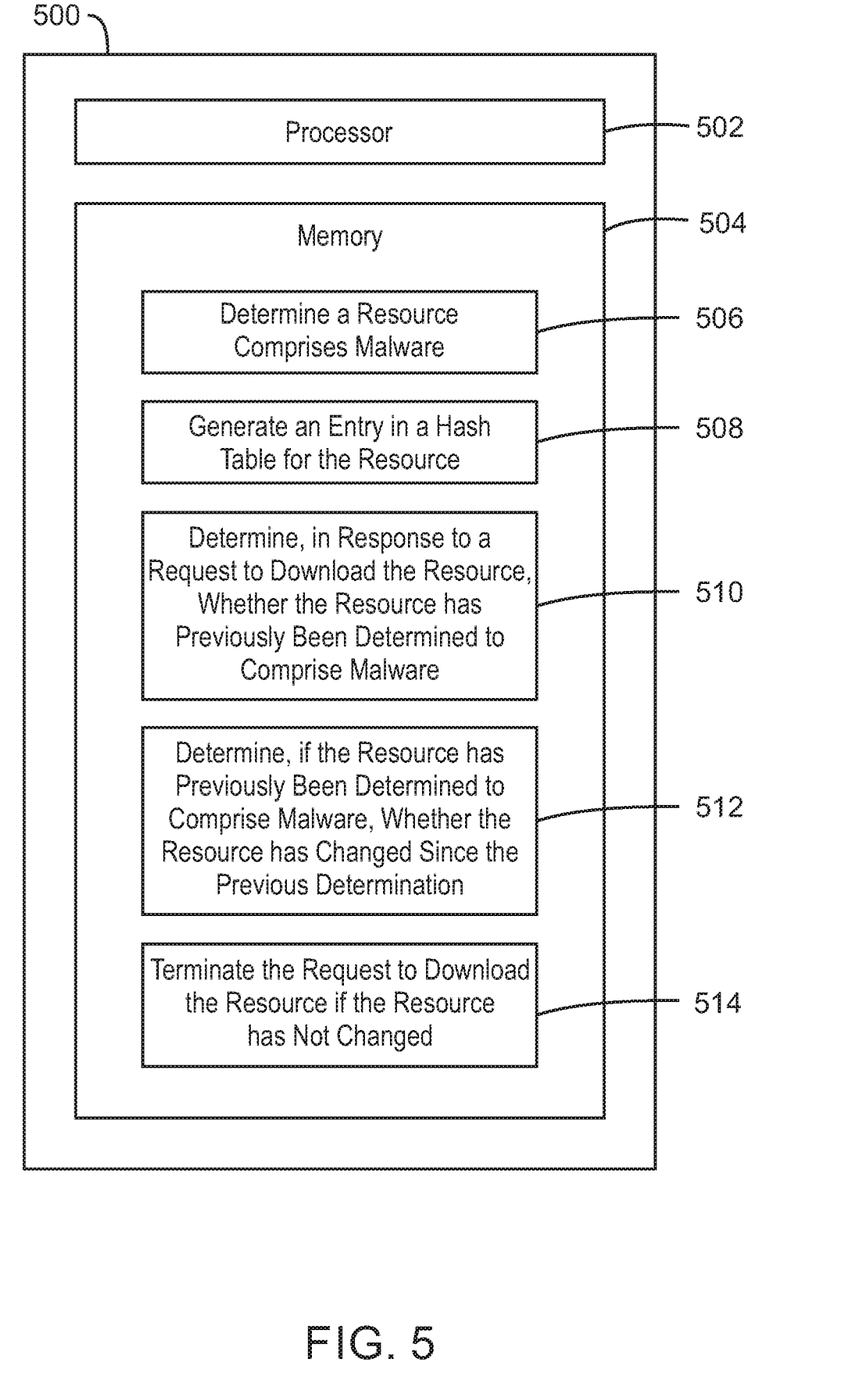
FIG. 5 is a block diagram of an example system for detecting malware.

FIG. 5 is a block diagram of an example system 500 for detecting malware. The system is generally referred to by the reference number 500. The system 500 is a computing device that includes a processor 502 and a memory 504. The memory 504 includes code 506 to determine a resource comprises malware. The memory 504 additionally includes code 508 to generate an entry in a hash table for the resource. Further, the memory 504 includes code 510 to determine, in response to a request to download a resource, whether the resource has previously been determined to comprise malware. Also, the memory 504 includes code 512 to determine, if the resource has previously been determined to comprise malware, whether the resource has changed since the previous determination. Further, the memory 504 includes code 514 to terminate the request to download the resource if the resource has not changed.

Figure 6:
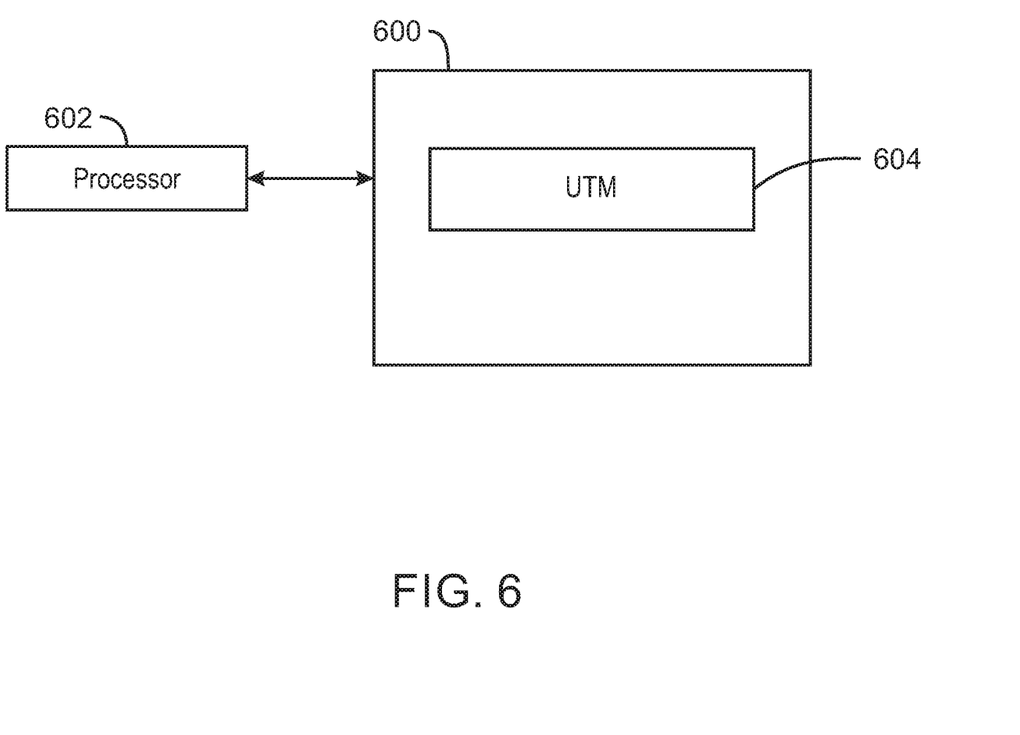
FIG. 6 is a block diagram showing an example non-transitory, tangible computer-readable medium that stores code for detecting malware.

FIG. 6 is a block diagram showing an example non-transitory, tangible computer-readable medium 600 that stores code for detecting malware. The non-transitory, tangible computer-readable medium is generally referred to by the reference number 600.

The non-transitory, tangible computer-readable medium 600 may correspond to any typical storage device that stores computer-implemented instructions, such as programming code or the like. For example, the non-transitory, tangible computer-readable medium 600 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 602 generally retrieves and executes the computer-implemented instructions stored in the non-transitory, tangible computer-readable medium 600 for graph-based merger of detections. A unified threat manager 604 may detect malware for resources previously requested. In examples of the claimed subject matter. The unified threat manager 604 maintains a hash lookup table that contains an entry for all requested resources found to contain malware. Subsequently, whenever a resource is requested, the UTM 604 checks the hash lookup table to determine if the resource was previously determined to contain malware. If so, the current Etag of the resource is compared to the Etag at the time the resource was determined to contain malware. If the Etag is not changed, the resource is determined to still contain malware, and the connection with the server providing the resource is reset.

Although shown as contiguous blocks, the software components can be stored in any order or configuration. For example, if the computer-readable medium 600 is a hard drive, the software components can be stored in non-contiguous, or even overlapping, sectors.

Figure 7:
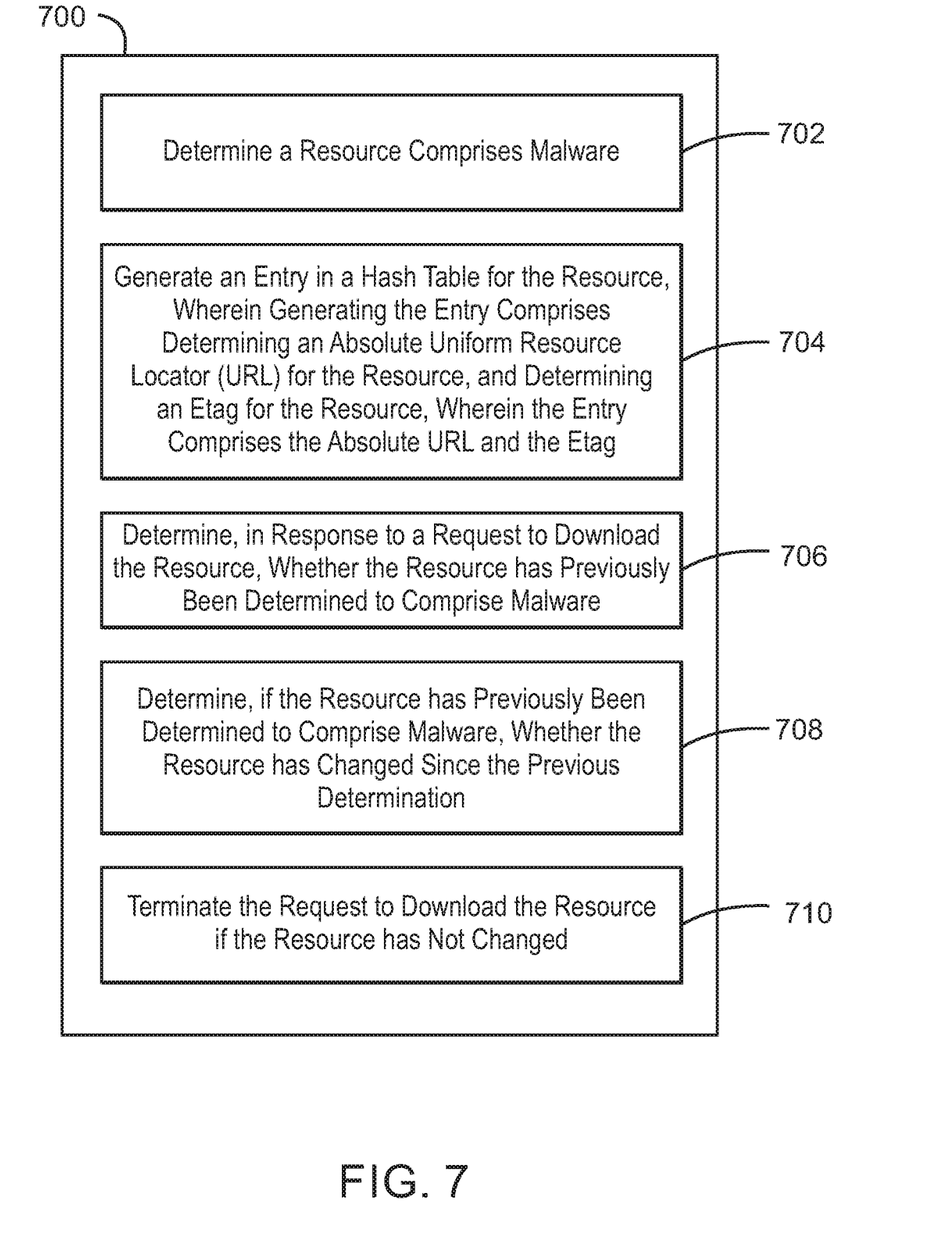
FIG. 7 is a block diagram showing an example non-transitory, tangible computer-readable medium that stores code for detecting malware.

FIG. 7 is a block diagram showing an example non-transitory, tangible computer-readable medium 700 that stores code for detecting malware. The non-transitory, tangible computer-readable medium is generally referred to by the reference number 700. The medium 700 includes code 702 to determine a resource comprises malware. The medium 700 also includes code 704 to generate an entry in a hash table for the resource, wherein generating the entry comprises determining an absolute uniform resource locator (URL) for the resource, and determining an Etag for the resource, wherein the entry comprises the absolute URL and the Etag. Additionally, the medium 700 includes code 706 to determine, in response to a request to download the resource, whether the resource has previously been determined to comprise malware. Further, the medium 700 includes code 708 to determine, if the resource has previously been determined to comprise malware, whether the resource has changed since the previous determination. Also, the medium 700 includes code 710 to terminate the request to download the resource if the resource has not changed.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for detecting malware, comprising:
   determining, by a firewall device, whether a resource comprises malware;
   generating, by the firewall device, an entry in a hash table for the resource upon a determination that the resource comprises malware, wherein generating the entry comprises:
      determining an absolute uniform resource locator (URL) for the resource; and
      determining an Etag for the resource, wherein the entry comprises the absolute URL and the Etag;
   determining, by the firewall device, in response to a subsequent request to download the resource, whether the resource has previously been determined to comprise malware, wherein determining whether the resource has previously been determined to comprise malware comprises performing a lookup in the hash table based on the absolute URL, wherein the resource has previously been determined to comprise malware if the lookup is successful, a successful lookup comprising a determination that the Etag of the generated entry in the hash table matches an Etag in a header packet of the subsequently requested resource;
   determining, by the firewall device, if the resource has previously been determined to comprise malware, whether the resource has changed since the previous determination, wherein determining whether the resource has changed comprises:
      determining the Etag based on the successful lookup;
      determining a current Etag for the resource; and
      comparing the Etag to the current Etag, wherein the resource has not changed if the Etag is equal to the current Etag; and
   terminating, by the firewall device, the request to download the resource if the resource has not changed.

2. The method of claim 1, wherein determining the resource comprises malware comprises one of:
- signature scanning the resource;
- performing a hash lookup of an entire file comprising the resource; and
- monitoring the resource in a sandbox execution environment.

3. A system for detecting malware, comprising:
a processor; and
a memory comprising code that causes the processor to:
- determine a resource comprises malware;
- generate an entry in a hash table for the resource upon a determination that the resource comprises malware, wherein to generate the entry, the code causes the processor to:
  - determine an absolute uniform resource locator (URL) for the resource; and
  - determine an Etag for the resource, wherein the entry comprises the absolute URL and the Etag;
- determine, in response to a subsequent request to download the resource, whether the resource has previously been determined to comprise malware, wherein the determination whether the resource has previously been determined to comprise malware comprises performing a lookup in the hash table based on the absolute URL, wherein the resource has previously been determined to comprise malware if the lookup is successful, a successful lookup comprising a determination that the Etag of the generated entry in the hash table matches an Etag in a header packet of the subsequently requested resource;
- determine, if the resource has previously been determined to comprise malware, whether the resource has changed since the previous determination, wherein to determine whether the resource has changed, the code causes the processor to:
  - determining the Etag based on the successful lookup;
  - determining a current Etag for the resource; and
  - comparing the Etag to the current Etag, wherein the resource has not changed if the Etag is equal to the current Etag; and
- terminate the request to download the resource if the resource has not changed.

4. The system of claim 3, wherein determining the resource comprises malware comprises one of:
- signature scanning the resource;
- performing a hash lookup of an entire file comprising the resource; and
- monitoring the resource in a sandbox execution environment.

5. A non-transitory, tangible computer-readable medium, comprising code to direct a processor to:
- determine a resource comprises malware;
- generate an entry in a hash table for the resource upon a determination that the resource comprises malware, wherein generating the entry comprises:
  - determining an absolute uniform resource locator (URL) for the resource; and
  - determining an Etag for the resource, wherein the entry comprises the absolute URL and the Etag;
- determine, in response to a subsequent request to download the resource, whether the resource has previously been determined to comprise malware, wherein the determination whether the resource has previously been determined to comprise malware comprises performing a lookup in the hash table based on the absolute URL, wherein the resource has previously been determined to comprise malware if the lookup is successful, a successful lookup comprising a determination that the Etag of the generated entry in the hash table matches an Etag in a header packet of the subsequently requested resource;
- determine, if the resource has previously been determined to comprise malware, whether the resource has changed since the previous determination, wherein determining whether the resource has changed comprises:
  - determining the Etag based on the successful lookup;
  - determining a current Etag for the resource; and
  - comparing the Etag to the current Etag, wherein the resource has not changed if the Etag is equal to the current Etag; and
- terminate the request to download the resource if the resource has not changed.

\* \* \* \* \*